(12) United States Patent
Berloni (10) Patent No.: US 10,856,658 B2
(45) Date of Patent: Dec. 8, 2020

(54) KIT FOR PROVIDING MODULAR KITCHENS

(71) Applicant: IBK PROJECT SRL, Pesaro (IT)

(72) Inventor: Massimo Berloni, Pesaro (IT)

(73) Assignee: IBK PROJECT SRL, Pesaro (IT)

( * ) Notice: Subject to any disclaimer, the term of this patent is extended or adjusted under 35 U.S.C. 154(b) by 0 days.

(21) Appl. No.: 16/468,077

(22) PCT Filed: Dec. 11, 2017

(86) PCT No.: PCT/IB2017/057787
§ 371 (c)(1),
(2) Date: Jun. 10, 2019

(87) PCT Pub. No.: WO2018/109635
PCT Pub. Date: Jun. 21, 2018

(65) Prior Publication Data
US 2020/0069050 A1     Mar. 5, 2020

(30) Foreign Application Priority Data

Dec. 12, 2016   (IT) .................. 202016000124796

(51) Int. Cl.
*A47B 77/02*     (2006.01)
*A47B 47/00*     (2006.01)
(Continued)

(52) U.S. Cl.
CPC .......... *A47B 77/02* (2013.01); *A47B 47/0041* (2013.01); *F16B 12/2063* (2013.01);
(Continued)

(58) Field of Classification Search
CPC . A47B 47/00; A47B 47/0033; A47B 47/0041; A47B 77/00; A47B 77/02; F16B 12/2063
(Continued)

(56) References Cited

U.S. PATENT DOCUMENTS 2,466,869 A * 4/1949 Triller .................... A47B 77/02
312/326
3,178,244 A * 4/1965 Reiss ..................... A47B 77/02
312/265.4
(Continued)

FOREIGN PATENT DOCUMENTS

CH         692689 A5   9/2002
DE      19624673 C1   7/1997
(Continued)

OTHER PUBLICATIONS

International Search Report and Written Opinion dated Feb. 21, 2018 issued in PCT/IB2017/057787.

*Primary Examiner* — James O Hansen
(74) *Attorney, Agent, or Firm* — Scully, Scott, Murphy & Presser, P.C.

(57) ABSTRACT

A kit for providing modular kitchens, which comprises: a plurality of panels, each one defining two mutually opposite greater faces and four side faces; a plurality of battens, each one defining four side surfaces which are interposed between respective base surfaces; a plurality of coupling assemblies, each one adapted for coupling between any side face of any panel and side surface of any batten, at least in order to provide a plurality of basic modular elements with a box-like shape structure, each one having at least two side panels and one lower panel; a plurality of covering walls; a plurality of sliding guide rails; a plurality of angular supports; a plurality of hinge assemblies.

8 Claims, 10 Drawing Sheets

(51) Int. Cl.
*F16B 12/20* (2006.01)
*F16B 7/04* (2006.01)

(52) U.S. Cl.
CPC ..... *A47B 47/0075* (2013.01); *A47B 2077/025* (2013.01); *A47B 2230/0025* (2013.01); *F16B 7/0466* (2013.01)

(58) Field of Classification Search
USPC .......................... 312/198, 257.1, 265.2, 108
See application file for complete search history.

(56) References Cited

U.S. PATENT DOCUMENTS

| | | | | |
|---|---|---|---|---|
| 3,360,320 A | * | 12/1967 | Ernst | A47B 47/03 312/265.3 |
| 3,877,765 A | * | 4/1975 | Hassing | A47B 47/00 312/265.4 |
| 3,971,605 A | * | 7/1976 | Sasnett | A47B 77/02 312/198 |
| 4,126,364 A | * | 11/1978 | Reilly | F16B 12/50 312/140 |
| 4,432,590 A | * | 2/1984 | Lawrence | A47B 47/04 108/156 |
| 4,653,652 A | * | 3/1987 | Avati | F16B 12/32 211/182 |
| 5,927,838 A | * | 7/1999 | Hellman, Jr. | A47B 47/02 312/257.1 |
| 6,152,553 A | * | 11/2000 | Wunderlich | A47B 47/0091 108/110 |
| 6,409,292 B1 | * | 6/2002 | Janowitz | A61B 50/10 312/257.1 |
| 7,918,515 B2 | * | 4/2011 | Wang | A47B 87/005 211/194 |
| 9,504,323 B1 | * | 11/2016 | Porreca | A47B 88/407 |
| 2010/0084356 A1 | | 4/2010 | Wang | |
| 2012/0153782 A1 | * | 6/2012 | Fraser | A47B 77/02 312/109 |
| 2016/0262535 A1 | | 9/2016 | Berloni | |

FOREIGN PATENT DOCUMENTS

EP 2853172 A1 4/2015
WO WO 2012/156781 A1 11/2012

\* cited by examiner

KIT FOR PROVIDING MODULAR KITCHENS

CROSS-REFERENCE TO RELATED APPLICATIONS

This Application is a 371 of International Application PCT/IB2017/057787, filed on Dec. 11, 2017 which claims priority to Application IT 202016000124796 filed on Dec. 12, 2016.

BACKGROUND OF THE DISCLOSURE

The present invention relates to a kit for providing modular kitchens.

As is known, modular kitchens are sets of furniture, intended to furnish a kitchen, which are chosen and combined so as to fit the dimensions and shape structure of the specific room that they will occupy, and the requirements and tastes of the end user.

Over time therefore, the available range of such type of kitchens has developed and diversified, while at the same time being able to rely on pleasing customers, for whom the possibility of customization has evidently been found to be a deciding factor in the purchase.

In order to be able to meet the various different requirements, makers of kitchens have been forced to design and offer solutions in which, during initial installation, different modules can be chosen and combined with each other, each module having a specific function and being provided with specific components.

The customer therefore can "design" the furniture of his or her kitchen at will, in that he or she can in fact choose and distribute in the designated room modules that comprise furniture of various types (wall cupboards, angular supports, with shelves, drawer units, door leaves, tilting door leaves, cooktops, flue pipes etc.) and optionally electrical household appliances, adapting them in any case to the available spaces.

But this very initial versatility can be a limitation, in that after having installed the various elements of the kitchen, which were chosen and dimensioned to adapt to the specific context (the available spaces and the other elements of the kitchen), any subsequent modification requires the substantial substitution of all the components of the module, with evident inconvenience for the customer (and corresponding high economic outlay).

While in fact, and only within certain limitations, it is possible if needed to substitute single door leaves or provide new coverings, it is almost impossible to convert any module to a different use or function.

If therefore, for example, the purchaser wants to substitute a set of drawers with a shelving unit, or to accommodate a cooktop in the module that previously housed the dishwasher (or accommodate a dishwasher of different dimensions), or install a corner solution where earlier there was a linear development, it becomes necessary to turn the kitchen upside down (or at least to completely substitute the entire module), with significant costs and inconvenience.

It should be noted however that such limitation causes inconvenience for the manufacturer of kitchens as well, as they find themselves forced to keep a high number of product codes in stock, since each module of the kitchen requires a dedicated set of components, which can therefore in each instance be required by the customer, during first installation or subsequently.

In addition, often the damaging or deterioration of a single element also entails considerable costs, in that in any case its substitution must necessarily also involve other components or the entire module to which it belongs.

BRIEF SUMMARY OF THE DISCLOSURE

The aim of the present invention is to solve the above mentioned problems, by providing a kit for providing modular kitchens, which offers practical methods of modification and reconfiguration of the modules envisaged.

Within this aim, an object of the invention is to provide a kit that is extremely versatile, which makes it possible to practically and economically convert the various modules partially or totally.

Another object of the invention is to provide a kit that makes it possible to make substitutions and modifications of individual elements or modules easily, without requiring work on other elements or modules.

Another object of the invention is to provide a kit that ensures a high reliability of operation and/or which adopts an alternative technical and structural architecture to those of conventional kits.

A still further object of the invention is to provide a kit that can be easily implemented using elements and materials that are readily available on the market, which is low cost and which is certain to be safe in use.

This aim and these and other objects which will become better apparent hereinafter are all achieved by a kit according to claim 1.

BRIEF DESCRIPTION OF THE SEVERAL VIEWS OF THE DRAWINGS

Further characteristics and advantages of the invention will become better apparent from the description of a preferred, but not exclusive, embodiment of the kit according to the invention, which is illustrated by way of non-limiting example in the accompanying drawings wherein.

DETAILED DESCRIPTION OF THE DISCLOSURE

With particular reference to the figures, the subject matter of the present discussion is a kit for providing modular kitchens 1 which comprises first of all a plurality of panels 2, each one defining two mutually opposite greater faces 2a and four side faces 2b (which are also, obviously, in mutually opposite pairs).

The panels 2 are substantially rectangular and can be included in the kit in a single format or in several different formats (i.e. according to different values for each one of the three dimensions and/or the respective proportions). Furthermore, the panels 2 can be made of wood, aluminum, composite materials or the like, according to the requirements and tastes of the customer and/or the robustness constraints imposed by the specific case.

Furthermore, the kit comprises a plurality of battens 3, each one of which defines four side surfaces 3a which are interposed between respective base surfaces 3b.

The battens 3 can also be made of any material (and for example the same material used for the panels 2), while remaining within the scope of protection claimed herein.

The kit according to the invention further comprises a plurality of coupling assemblies 4, each one adapted for coupling between any one of the side faces 2b of any panel 2 and any one of the side surfaces 3a of any batten 3.

By way of panels 2 and battens 3 it is thus at least possible to provide basic modular elements 5 with a box-like shape structure, each one having at least two side panels 2 and one lower panel 2 (and, preferably, also an upper panel 2), joined in pairs at the respective side faces 2b by virtue of the battens 3.

With such structure, the modular elements 5 can already define a compartment for containing electrical household appliances and utensils, and therefore they can be maintained in such simple configuration, or, as will be seen below, they can constitute the basis for subsequent customizations, using other components of the kit according to the invention, in order to perform particular functions.

Various modular elements 5, aligned on one or more parallel rows, can be placed against a wall of the designated room and, by earmarking them for different functions, they can represent the base structure of the modular kitchen 1. Furthermore, as indeed in the solution in the accompanying figures, it is possible to align other modular elements 5 perpendicularly to the first, in order to then connect them in an effective manner by way of adapted components, included in the kit and which will be better described in the following pages, thus obtaining furnishing solutions that are even more comprehensive and attractive, as a function obviously of the available space.

It should likewise be noted that the modular elements 5 can also be closed at the rear by back walls, preferably but not exclusively constituted by further panels 2.

It is important to note that the possibility of using only panels 2 and battens 3 (all of which can be coupled at each one of the four side surfaces 3a to corresponding panels 2) makes it possible to provide kitchens 1 made up of a plurality of modular elements 5 with a reduced number of components. In fact, adjacent modular elements 5 share a panel 2 and therefore effectively each modular element 5 is composed of only three panels 2 (a lower one, an upper one and a side one), because the second side panel 2 is also the first side panel 2 of the adjacent modular element 5.

It should likewise be noted from this point onward that the protection claimed herein extends to any type of coupling assembly 4, as long as it enables the mutual coupling between any one of the side faces 2b of each panel 2 to any of the side surfaces 3a of each batten 3. In any case, in the following pages some possible embodiments will be illustrated of such coupling assemblies 4 (and illustrated in the accompanying figures), but these should not be considered limiting of the scope of protection claimed herein.

The kit according to the invention also comprises a plurality of covering walls 6, 6a, which can be stably applied on respective greater faces 2a of the panels 2. As will be better explained below, the covering walls 6, 6a can have shapes and dimensions complementary to those of the panels 2 and of their greater faces 2a in particular (and in such case these are indicated in the accompanying figures with the reference numeral 6), or have smaller dimensions (6a), as a function of the role that they will be called on to play. In fact, the covering walls 66, 6a make it possible to increase the robustness of the modular elements 5 and can facilitate the anchoring of further components, intended to confer specific functionalities (although the possibility is not ruled out of connecting such components directly to the panels 2).

Furthermore, the covering walls 6 can simply be applied outside a modular element 5, at an exposed greater face 2a, in order to change the appearance or the color in a practical and easy manner.

The kit according to the invention also comprises therefore a plurality of sliding guide rails 7 for respective drawers 8 (which can also be part of the kit, in a number chosen at will).

As anticipated in the foregoing paragraphs, the rails 7 are stably anchorable in pairs to mutually opposite pairs of panels 2 and/or (preferably) of covering walls 6 (in this case indeed, preferably with dimensions complementary to those of the respective panel 2), so as to permit the assembly of modular elements 5 that define respective drawer units, as shown in FIGS. 8 to 12.

As indeed clearly emerges from these figures, the assembly of drawer units is very practical and easy: on two covering walls 6 it is possible to fix a pair of rails 7, obviously taking care to arrange them at the same vertical height, so as to have them aligned and capable of cooperating, once installation is complete, for the slideable guiding of a respective drawer 8.

Therefore, after having put together the base structure of the modular element 5 (with panels 2, battens 3 and coupling assemblies 4), it is possible to apply the covering walls 6 (FIGS. 8 and 9), already provided with rails 7, internally on the side panels 2, in view of the need to support rails 7 and drawers 8.

The rails 7 can be mounted according to conventional methods on the covering walls 6, just as it is possible according to known techniques to apply each covering wall 6 on the respective greater face 2a of the corresponding panel 2.

Figures 10, 11, 12:
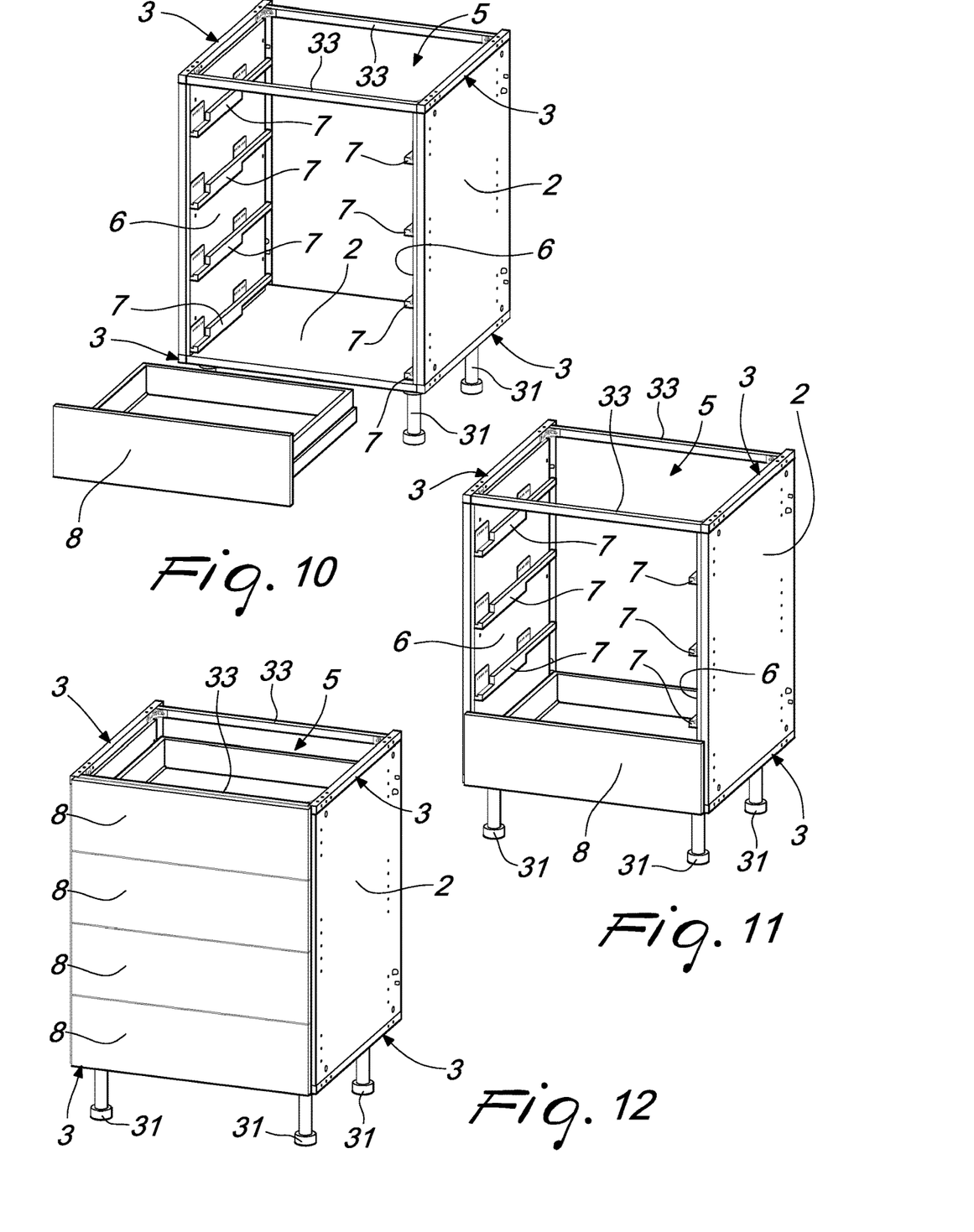

It is therefore progressively possible to mount the various drawers 8 on the rails 7 (FIGS. 10, 11 and 12) so that they can slide, until the complete chest of drawers is obtained (FIG. 12).

It should therefore be noted that the chest of drawers is effectively obtained from the usual modular element 5, simply by mounting the covering walls 6 with the rails 7 and the drawers 8 on the side panels 2. The subsequent disassembly of such components, evidently equally practical and easy, makes it possible to restore the base structure of the modular element 5, in order to be able to reconvert to another use and function, simply and rapidly.

The kit according to the invention comprises a plurality of angular supports 9 (for example metal, but they can also be made of other materials).

The angular supports 9 are stably anchorable in pairs to mutually opposite pairs of panels 2 and/or (preferably) of covering walls 6 (again in this case, preferably with dimensions complementary to those of the respective panel 2), so as to be able to support electrical household appliances (an oven for example) and the like.

It should be noted therefore that support for electrical household appliances of greater or lesser weight can also be provided on the base structure of a modular element 5, simply by coupling respective angular supports 9 to the side panels 2 (to this end, the panels 2 and/or the covering walls 6 can be provided with a plurality of holes, into which to insert a fixing unit such as a screw, a nail, a rivet, and the like, necessary for affixing the angular supports 9, or indeed the rails 7, or the like).

To reconvert the modular element 5, it is therefore sufficient to remove the electrical household appliance and dismantle the angular supports 9, in order to have once more a base structure available to designate for new uses.

Figure 13:
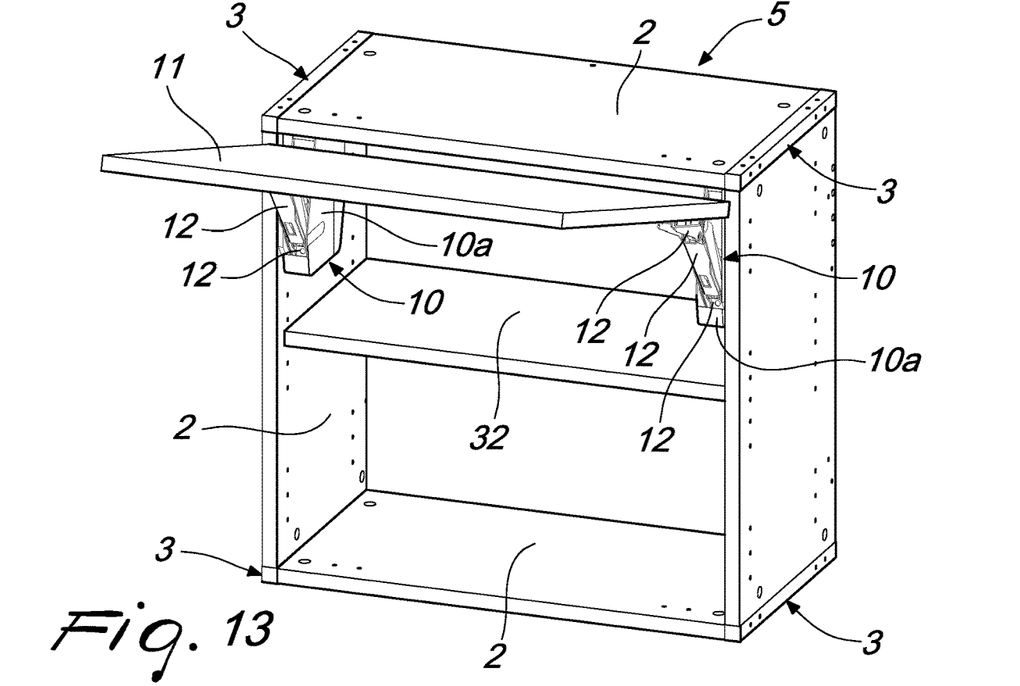
FIGS. 13 and 14 are respectively a perspective view and an exploded perspective view of a third detail of the kitchen in FIG. 1 and show two hinge assemblies.
Figure 14:
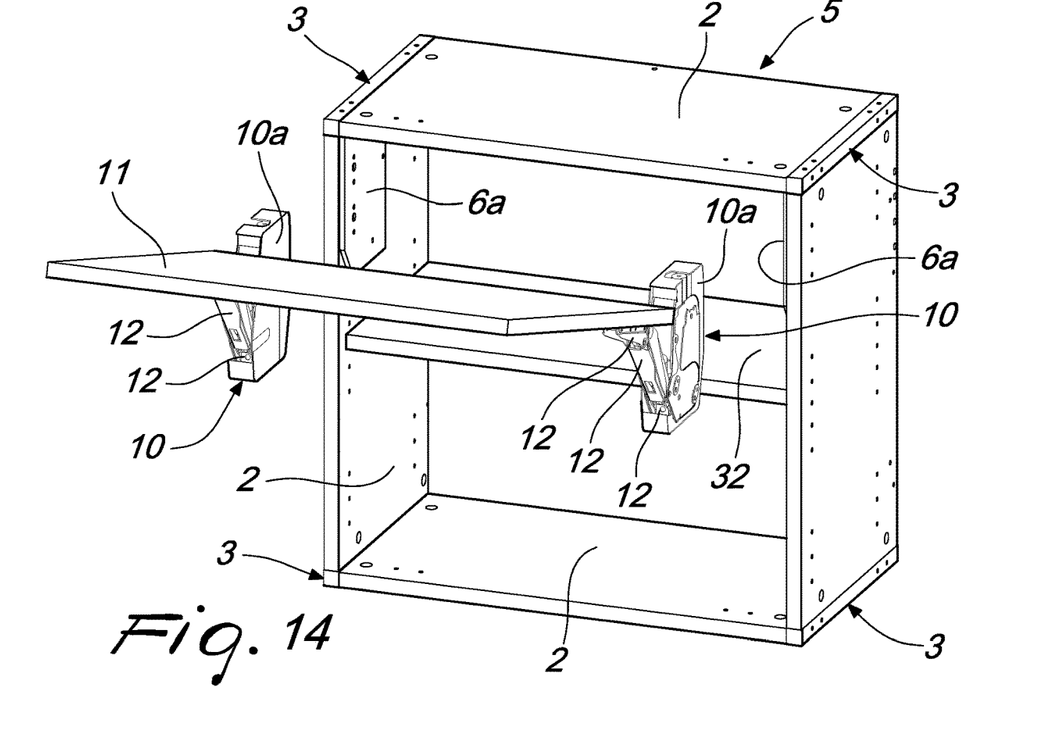

The kit according to the invention also comprises a plurality of hinge assemblies 10, which can be conventional, which make it possible to hinge closing door leaves 11 (FIGS. 13 and 14) to respective panels 2 and/or to corresponding covering walls 6, 6a (in this case, preferably of smaller dimensions than those of the corresponding panel 2).

The accompanying figures show a pair of hinge assemblies 10, each one of which comprises a kinematic chain that comprises a plurality of members 12, the first and the last of which being coupled stably respectively to a panel 2 and to a door leaf 11, so as to give them the capacity to rotate about a horizontal axis.

In any case the kit will also come with hinge assemblies 10 that are adapted to determine the hinging of (swinging) door leaves 11 about vertical axes; more generally, the kit can comprise several series of hinge assemblies 10, so as to associate any type of door leaf 11 (swinging, drop-leaf, hopper-fashion, etc.) with the panels 2 (or with the covering walls 6, 6a), while remaining within the scope of protection claimed herein.

Figure 15:
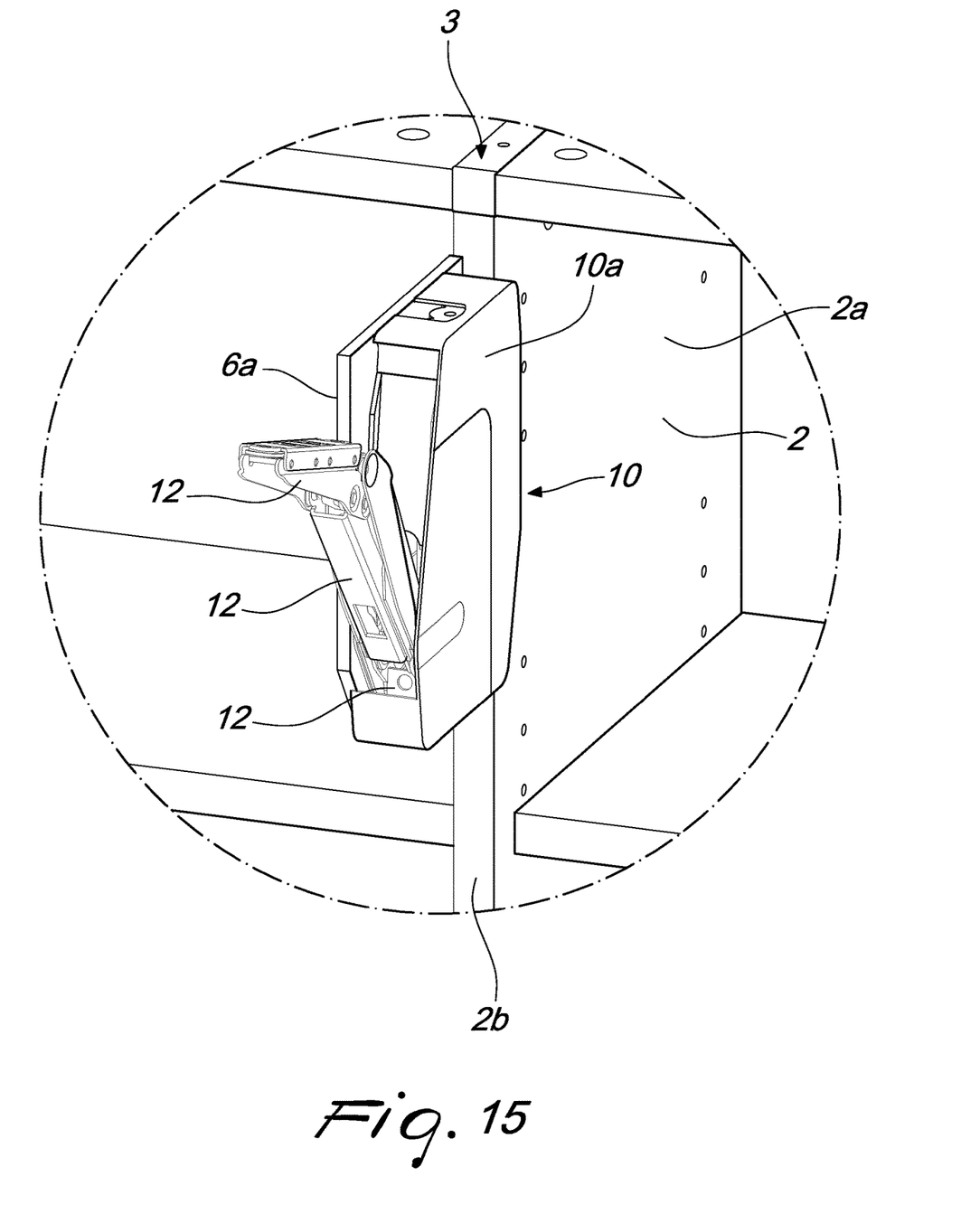
FIG. 15 is a greatly-enlarged perspective view of a hinge assembly.

As can also be seen from the accompanying figures, each hinge assembly 10 is (preferably but not exclusively) indirectly coupled to the respective panel 2, through a covering wall 6a that replicates the shape and the dimensions of the box 10a that accommodates the components of the hinge assembly 10. While not ruling out anchoring each hinge assembly 10 directly to the panel 2, the choice to use covering walls 6, 6a, and in particular covering walls 6a of smaller dimensions than the greater face 2a of the panel 2, reveals itself to be of great practical interest. In fact, on the covering wall 6, 6a it is possible to provide the various openings necessary to correctly affix the box 10a, which require a specific distribution. In this manner, it is possible to connect each hinge assembly 10 to any of the panels 2, without having to provide some of them especially (and therefore, maintaining great versatility and the possibility of reconversion of the principal components).

More generally, it should again be noted that the installation and uninstallation of door leaves 11 can be achieved simply by mounting and removing the hinge assemblies 10 (and the covering walls 6, 6a), therefore without altering the base structure of the modular element 5.

Conveniently, the kit also comprises a plurality of complementary slats 13: each one of these has an elongated substantially rectangular shape and can be coupled in a co-planar fashion with any one of the panels 2 and/or of the battens 3.

As can also be seen from FIGS. 1, 2, 3 and 4, the complementary slats 13 further increase the versatility of the kit according to the invention and the number of different configurations that can be obtained for the kitchen 1. In fact, by coupling a complementary slat 13 to a panel 2, arranged laterally in a modular element 5, it is possible to increase its height, for example in order to accommodate an electrical household appliance of greater dimensions than the one that was initially accommodated, or in order to be able to place a cooktop at a higher level, or the like.

It should be noted that the co-planar coupling to the panel 2 can be easily done using conventional fixing units, and a batten 3, another panel 2, or the like, according to the specific requirements, can be coupled on the other side from that of the complementary slat 13.

Figure 16:
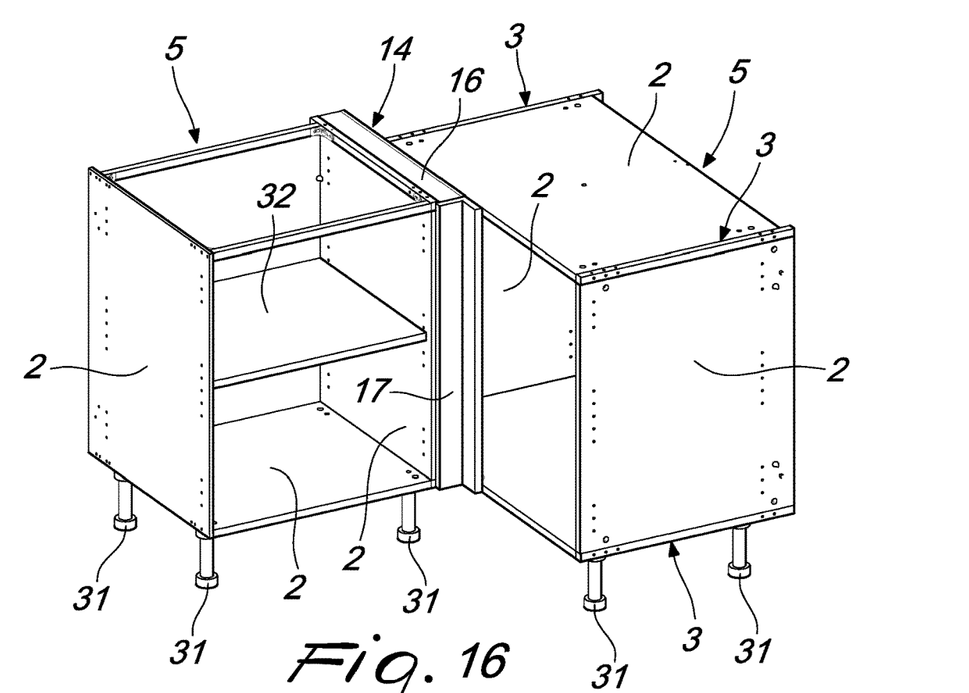
FIGS. 16 and 17 respectively a perspective view and an exploded perspective view of a fourth detail of the kitchen in FIG. 1.
Figure 17:
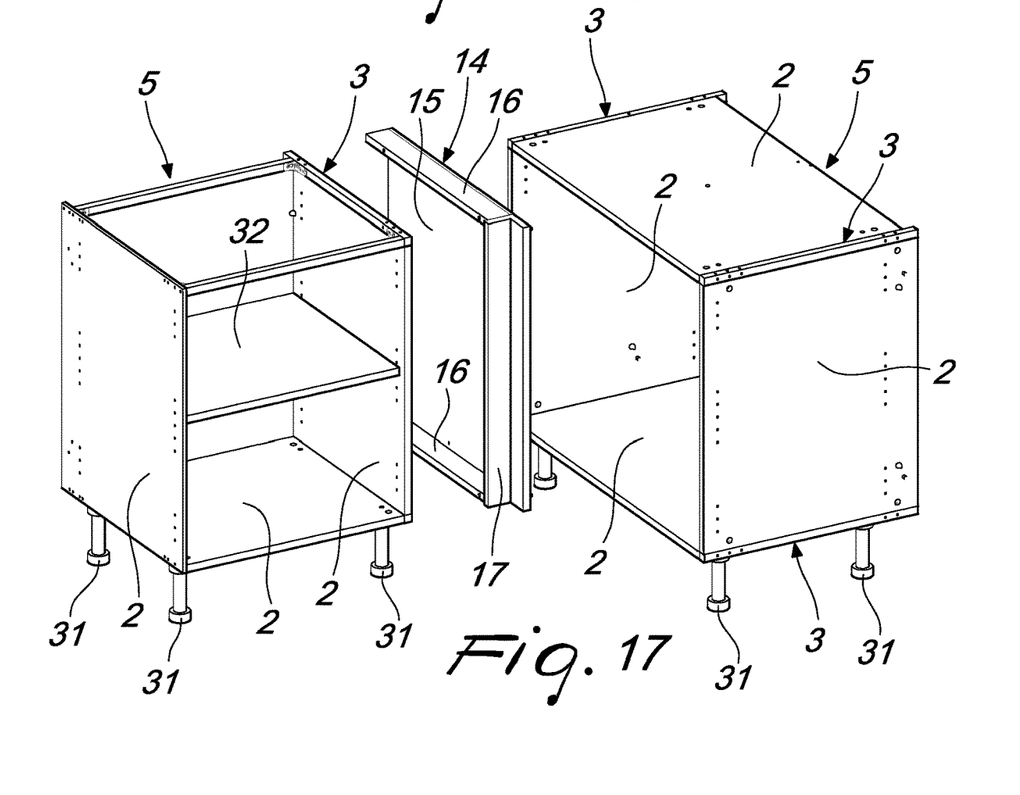

Conveniently, the kit comprises at least one corner connecting assembly 14 (FIGS. 16 and 17); as noted in the foregoing pages, it makes it possible to provide in a practical manner, and with an attractive design, modular kitchens 1 in an L-shaped layout, so as to be able to make use of two mutually perpendicular walls.

In more detail, the corner connecting assembly 14 is provided with at least one closing wall 15, which can also be chosen to be a panel 2 (so as to keep down the number of different components in the kit according to the invention). The closing wall 15 can in fact be arranged to (partially) close the outermost modular element 5, where the corner connection is to be provided.

The corner connecting assembly 14 is furthermore provided with two spacer slats 16, which are also chosen to be complementary slats 13 (again, in order to keep down the number of components and codes to be managed). Each spacer slat 16 can be coupled, with perpendicular orientation, to two mutually opposite first edges (the upper one and the lower one) of the closing wall 15, on the opposite side from the modular element 5 just cited.

On the opposite side from the closing wall 15, the side panel 2 of another modular element 5 can thus be placed and optionally affixed to the spacer slats 16, and thus with an orientation perpendicular to the previous modular element, in order to obtain the desired L-shaped layout.

Finally, the corner connecting assembly 14 is provided with a profiled element 17 which is L-shaped in cross-section and which can in turn be coupled, with its longitudinal rim, to a (vertical) third edge of the closing wall 15. Furthermore, the profiled element 17 can be coupled with each end thereof to a respective spacer slat 16.

Figure 1:
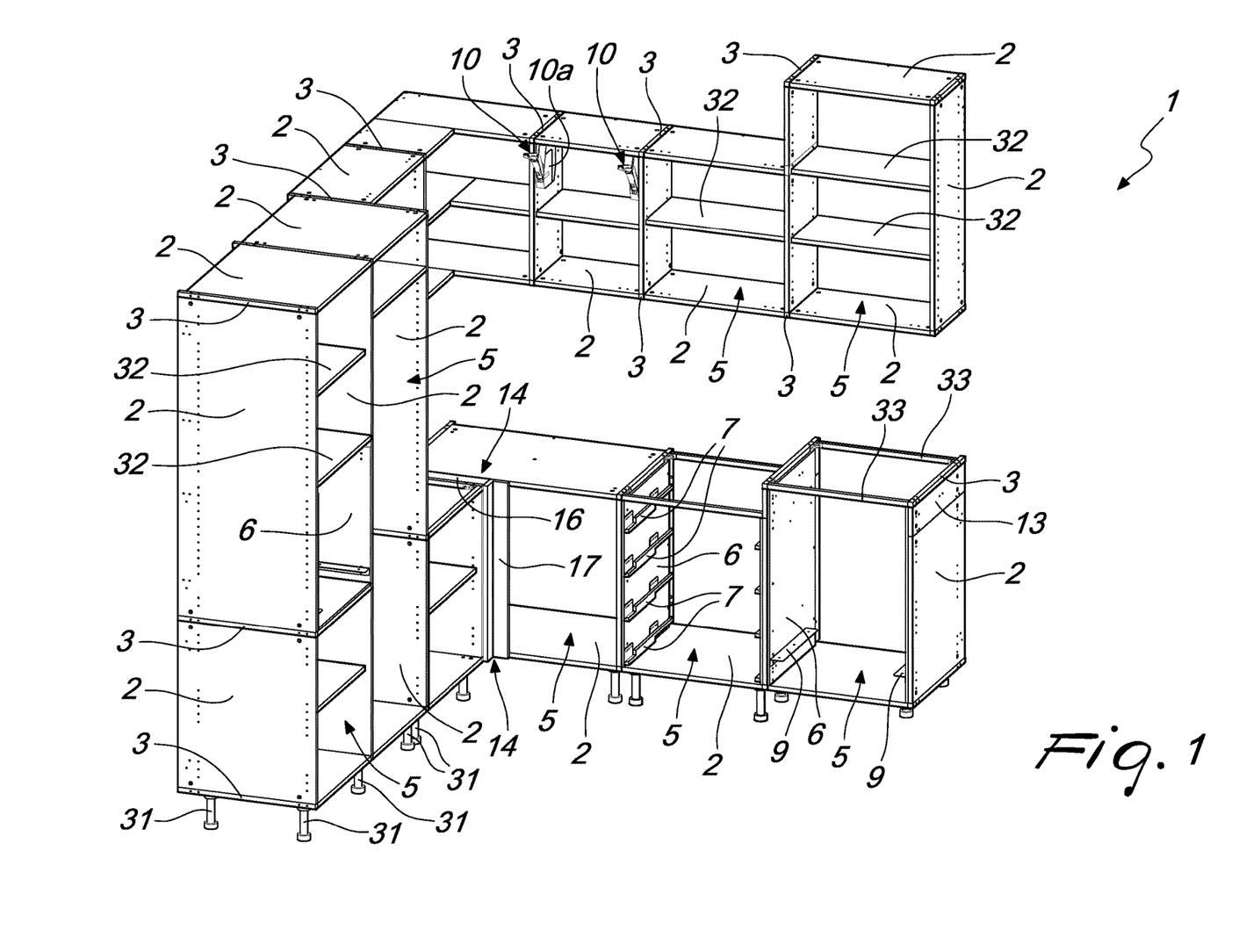
FIG. 1 is a perspective view of a modular kitchen that can be obtained using the kit according to the invention.
Figure 2:
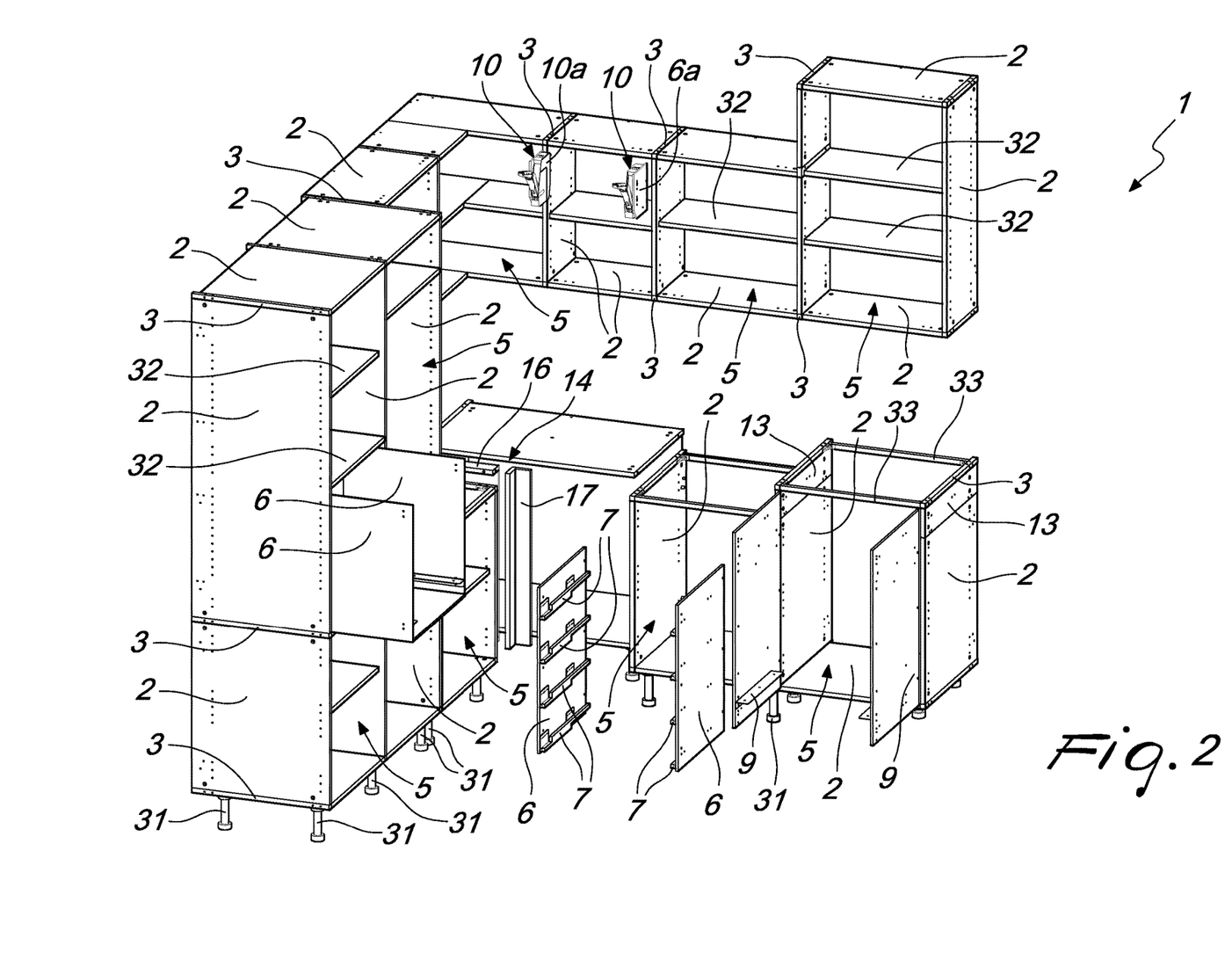
FIG. 2 is a partially exploded perspective view of the kitchen in FIG. 1.

As can also be seen from FIG. 1, the corner connecting assembly 14 thus makes it possible, by way of a few simple components, to obtain L-shaped layouts for the kitchen 1, in an evidently practical manner and with an attractive and elegant design.

It should likewise be noted that the corner connecting assembly 14 can evidently be installed at another time, on an outer modular element 5 of a pre-existing solution, thus enabling easy reconfigurations or being able to transfer a kitchen 1 or a part thereof from a first room to another, where the need is indeed felt to vary the arrangement and the occupation of the spaces.

Advantageously, in a possible practical embodiment of each coupling assembly 4, the latter comprises at least one collar 18 which can be inserted into one of a plurality of first seats 19, which in turn are provided proximate to the respective corners of at least one greater face 2a of each panel 2.

Furthermore, in such embodiment (corresponding to the two embodiments shown respectively in FIGS. 3 to 5, for the first, and 6, for the second), the coupling assembly 4 comprises at least one pin 20 which can be stably and partially inserted (according to conventional methods) into one of a plurality of second seats 21 which are provided along the side surfaces 3a of each batten 3.

At the other end, each pin 20 can likewise be inserted into a third seat 22, which is provided along a side face 2b of each panel 2 and leads to a corresponding first seat 19.

So in fact, the pin 20 enables a first (partial) coupling between panel 2 and batten 3, made stable by at least one grub screw 23, which is also part of the coupling assembly 4 in the embodiment now proposed.

In fact, the grub screw 23 (preferably but not exclusively threaded) can be inserted (by screwing or in another way) into a through passage 24, provided in the collar 18, until it engages with the pin 20, in order to prevent the subsequent extraction of that pin 20 and in fact obtain the stable coupling of the respective panel 2 with the corresponding batten 3.

Figures 3, 4, 5:
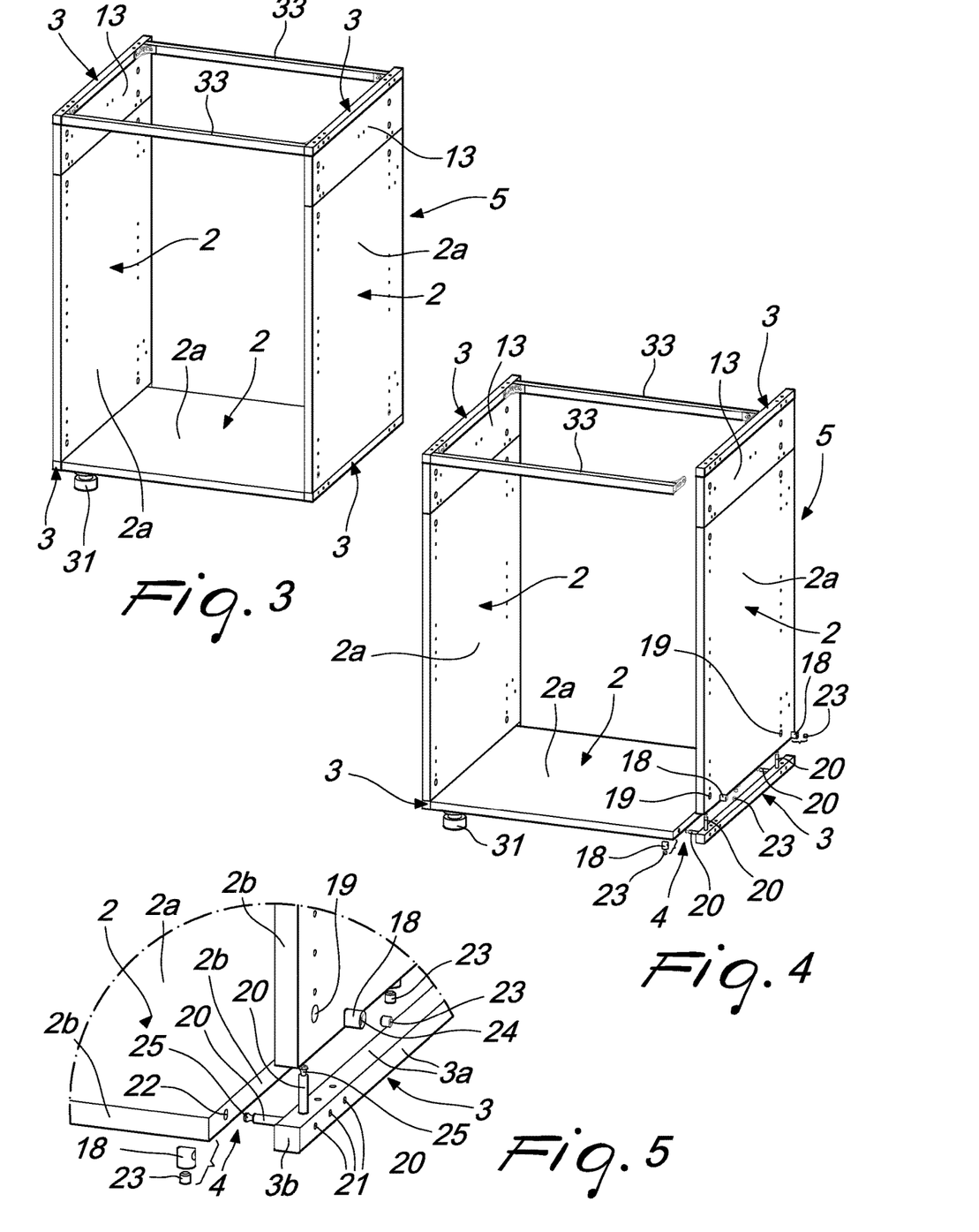
FIGS. 3 and 4 are respectively a perspective view and a partially-exploded perspective view of a first detail of the kitchen in FIG. 1.
FIG. 5 is an enlargement of FIG. 4 which shows the coupling assembly, in a first embodiment.

More specifically, such embodiment can entail, in a first embodiment illustrated in FIGS. 3 to 5, that the grub screw 23 be inserted into the passage 24 until it engages with a circumferential groove 25 which is provided along the pin 20 (FIG. 5). Evidently in fact, by inserting the grub screw 23 until its end portion is brought to the groove 25, any subsequent extraction is then prevented.

In a second embodiment (FIG. 6), which does not limit the possible practical applications of the embodiment described up to now, said grub screw (preferably threaded as noted) can be inserted into the passage 24 (which defines a respective female thread), until it engages with an eyelet 26 which is provided along the pin 20 (and thus still preventing extraction).

In the preferred embodiment, each batten 3 has a rectangular or square transverse cross-section and the side surfaces 3a are substantially solid.

Figure 6:
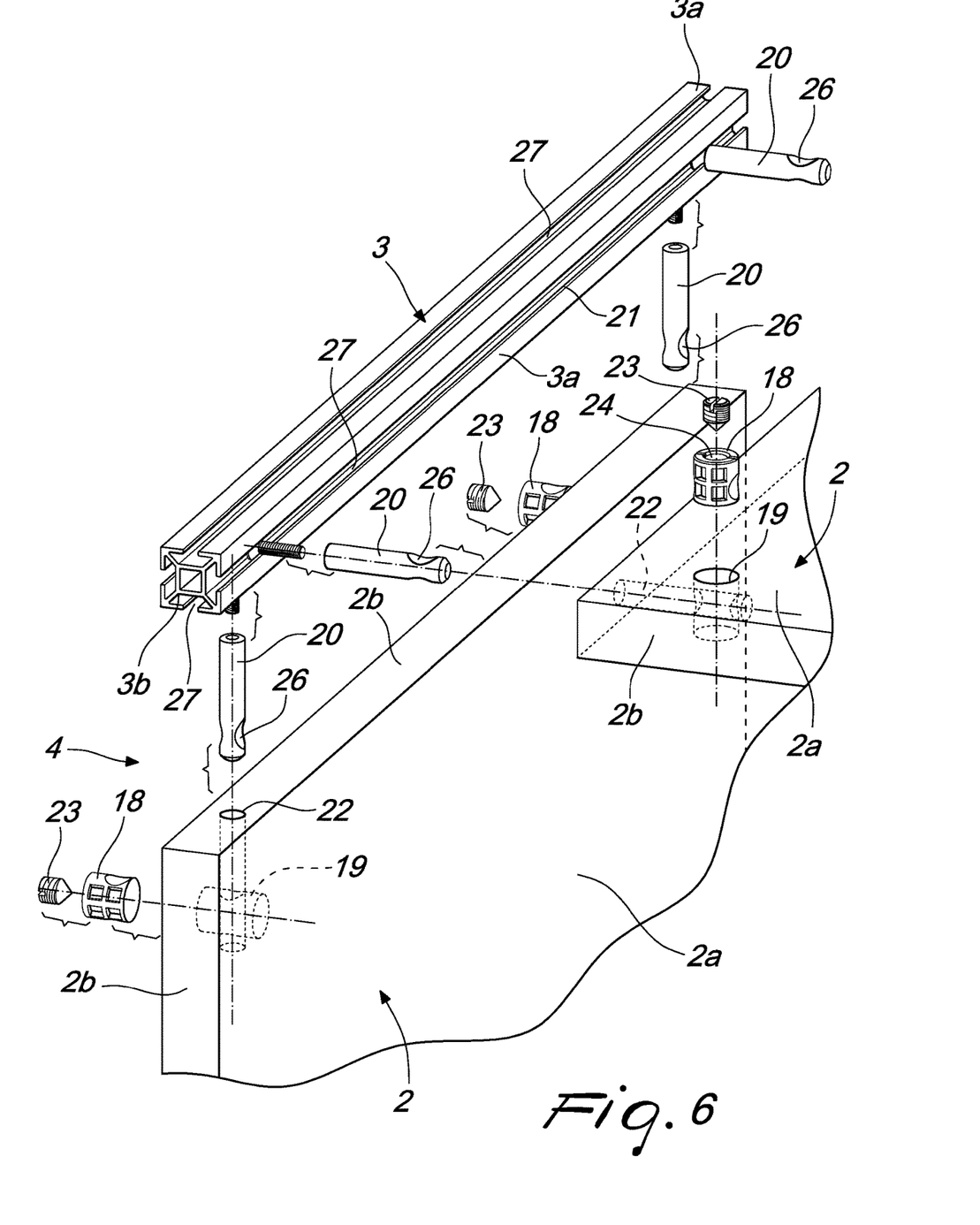
FIG. 6 is a perspective view of the coupling assembly, in a second embodiment.

In an alternative embodiment, shown in FIG. 6 and which is found to be of particular interest when the coupling assembly 4 is of the type shown in that figure, the battens 3 have substantially dovetail-shaped longitudinal grooves 27, which in this case define the second seats 21 and which extend substantially for the entire length of each one of the side surfaces 3a.

Figure 7:
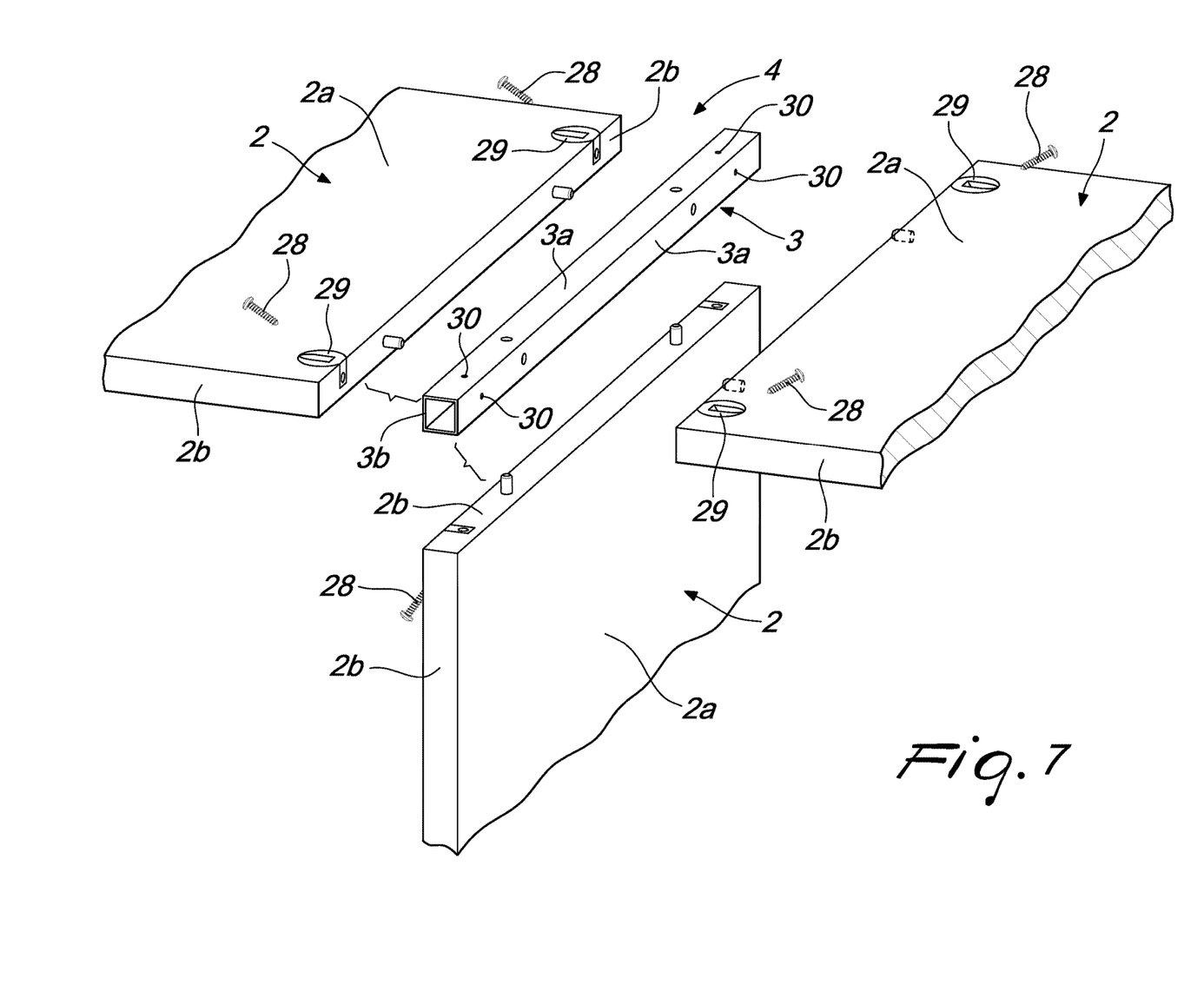
FIG. 7 is a perspective view of the coupling assembly, in a third embodiment.
Figure 8:
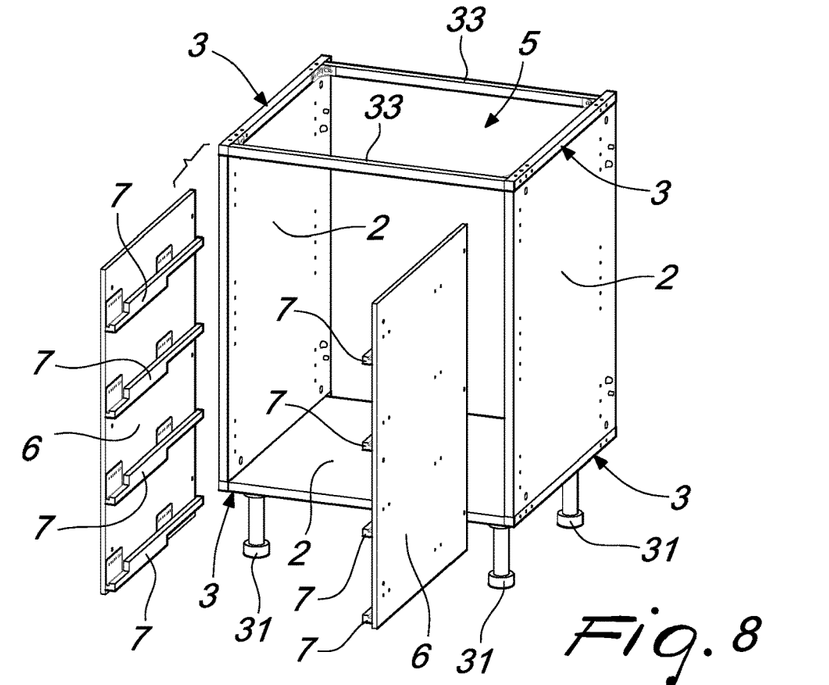
FIGS. 8 to 12 are perspective views of a second detail of the kitchen in FIG. 1 and show how drawers are assembled.
Figure 9:
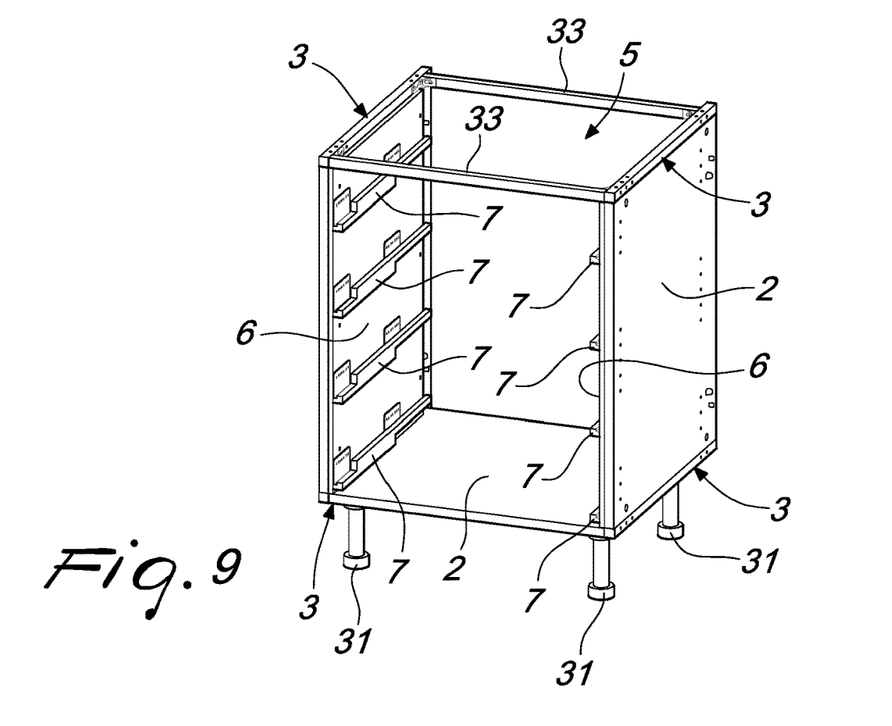

In a different embodiment, shown for the purposes of example in FIG. 7, the coupling assembly 4 comprises at least one fixing element 28, such as a screw, a nail, a rivet, and the like. Following the juxtaposition of any one of the side surfaces 3a of any batten 3 with any one of the side faces 2b of any panel 2, the fixing element 28 can be inserted into a through inclined seat 29, which is provided proximate to one side of the panel 2, and into a corresponding orifice 30, which is provided along the side surface 3a of the corresponding batten 3 and which can be aligned with the inclined seat 29. This makes it possible in fact to stably couple the respective panel 2 with the corresponding batten 3, as desired.

The various coupling assemblies 4 therefore enable practical methods of stable coupling between any panel 2 (at any one of its side faces 2b) and any batten 3 (at any one of its side surfaces 3a), thus ensuring maximum versatility and ample freedom of configuration of each modular element 5 and of the kitchen 1 in general.

Furthermore, each coupling assembly 4 can be easily removed, for subsequent operations to reconfigure the various components of the kitchen 1.

It should be noted that kits according to the invention can be provided and sold in which the coupling assemblies 4 are of a different type from those illustrated up to now, but which in any case remain within the scope of protection claimed herein.

It should furthermore be noted that one or more modular elements 5 can be completed with additional accessories, which in any case can be easily anchored to the panels 2 and/or to the battens 3, such as feet 31, shelves 32 (which can be chosen to be panels 2) or bars 33 (to be used for example in place of the battens 3, when it is desired to keep a modular element 5 open in an upward region while still ensuring the correct positioning of the side panels 2).

Thus the present discussion also relates to the modular kitchen 1, obtained using the kit described in the foregoing pages.

It has therefore been shown that the kit makes it possible to provide modular kitchens 1 in an absolutely versatile manner, while at the same time simultaneously ensuring practical methods of modification and reconversion.

In fact, a few simple components (panels 2, battens 3 and coupling assemblies 4) make it possible to assemble, in the basic structure thereof, the modular elements 5, which can then be distributed in the designated room in many ways (including at different heights, if wall cupboards are to be comprised in the kitchen), tailoring them to specific uses by way of the other components described.

As has been repeatedly shown above, the various components can be easily dismantled in order to be able to vary the intended use of each modular element 5 (and/or the appearance of the entire kitchen 1), without involving the other components and modular elements 5.

Just a few operations, which involve a small number of components, make it possible to transform each modular element 5 and therefore every item of furniture of the kitchen 1.

Thus, for example, a chest of drawers can be easily converted to an empty compartment intended to accommodate utensils (by removing the rails 7, the drawers 8 and then the covering walls 6), optionally inserting shelves 32. Alternatively, a modular element 5 can be raised by a few centimeters by adding a complementary slat 13, if it is desired to have a raised cooktop. Again, it will be possible to move an oven or a refrigerator by mounting or removing the angular supports 9, while, in the event of breakage or deterioration, practically every component can be removed and replaced without having to also intervene on other components.

The covering walls 6 can moreover be applied to the outer panels 2, simply to change the color and hence the appearance of the kitchen 1, just as some or all of the exposed panels 2 can be replaced with others made of finer materials, in order to quickly raise the quality of the kitchen 1.

All this is obtainable by way of a few components, since panels 2, battens 3 and coupling assemblies 4 can effectively define the base structure (with the modular element 5) for all the items of furniture of the kitchen 1, to which the few dedicated components for the necessary customizations simply need to be added.

While this can evidently be appreciated by the end user, for the manufacturers this peculiarity also translates to an evident saving in terms of codes to be managed and logistic simplicity.

Such components can also be used or supplied at another time, in order to vary and reconvert each modular element 5 if requirements change.

The extreme versatility and the possibility of mounting and removing individual components easily likewise make it possible to carry out localized replacements and repairs.

In practice it has been found that the kit according to the invention fully achieves the set aim, in that the plurality of components described and comprised in the kit make possible infinite modes of configuration and reconversion for a kitchen 1 and the modular elements 5 that go to make it up.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The content of Italian utility model application no. 202016000124796 (UA2016U265953), the priority of which is claimed in the present application, is incorporated as a reference.

The invention claimed is:

1. A kit for providing modular kitchens, characterized in that it comprises:
    a plurality of panels, each one defining two mutually opposite greater faces and four side faces,
    a plurality of battens, each one defining four side surfaces which are interposed between respective base surfaces,
    a plurality of coupling assemblies, each one adapted for coupling between any one of said side faces of any one of said panels and any one of said side surfaces of any one of said battens, at least in order to provide a plurality of basic modular elements with a box-like shape structure, each one having at least two said side panels and one said lower panel,
    a plurality of covering walls, which can be stably applied on respective said greater faces of said panels,
    a plurality of sliding guide rails for respective drawers, said rails being stably anchorable in pairs to mutually opposite pairs of said panels and/or of said covering walls,
    a plurality of angular supports, which are stably anchorable in pairs to mutually opposite pairs of said panels and/or of said covering walls,
    a plurality of hinge assemblies, for the hinging of closing door leaves to respective said panels and/or corresponding said covering walls; and
    at least one corner connecting assembly, which is provided at least with a closing wall, which can be of the type of said panels, with two spacer slats, which can be of the type of said complementary slats and can be coupled perpendicularly to two first opposing edges of said closing wall, and with a profiled element that is L-shaped in cross-section, which can be coupled with its longitudinal rim to a third edge of said closing wall and with each one of its ends to a respective said spacer slat.

2. The kit according to claim 1, further comprising a plurality of complementary slats, each one of said slats having an elongated substantially rectangular shape and being capable of being coupled in a co-planar fashion to any one of said panels and/or of said battens.

3. The kit according to claim 1, wherein each one of said coupling assemblies comprises:
    at least one collar which can be inserted into one of a plurality of first seats which are provided proximate to the respective corners of at least one of said greater faces of each one of said panels,
    at least one pin which can be stably and partially inserted, at one end, into one of a plurality of second seats which are provided along said side surfaces of each one of said battens and, at the other end, into a third seat, which is provided along a side face of each one of said panels and leads to a corresponding said first seat,
    at least one grub screw which can be inserted into a through passage, provided in said collar, until it engages with said pin, for preventing the extraction of said pin and stably, coupling the respective said panel with the corresponding said batten.

4. The kit according to claim 3, wherein said grub screw can be inserted into said passage until it engages with a circumferential groove which is provided along said pin.

5. The kit according to claim 3, wherein said grub screw can be inserted into said passage until it engages with an eyelet which is provided along said pin.

6. The kit according to claim 3, wherein said battens have longitudinal grooves that are substantially dovetail-shaped and which define said second seats which extend substantially for the entire length of each one of said side surfaces.

7. The kit according to claim 1, wherein said coupling assembly comprises at least one fixing element, following the juxtaposition of any one of said side surfaces of any one of said battens with any one of said side faces of any one of said panels, said fixing element being insertable into a through inclined seat which is provided proximate to one side of said panel and into a corresponding orifice, which is provided along said side surface of the corresponding said batten and which can be aligned with said inclined seat, in order to stably couple the corresponding said panel with the corresponding said batten.

8. A modular kitchen made with the kit according to claim 1.

* * * * *